AIR VENTING MEANS FOR PHOTOGRAPHIC FILM UNIT
Original Filed Aug. 19, 1969
FIG. 1
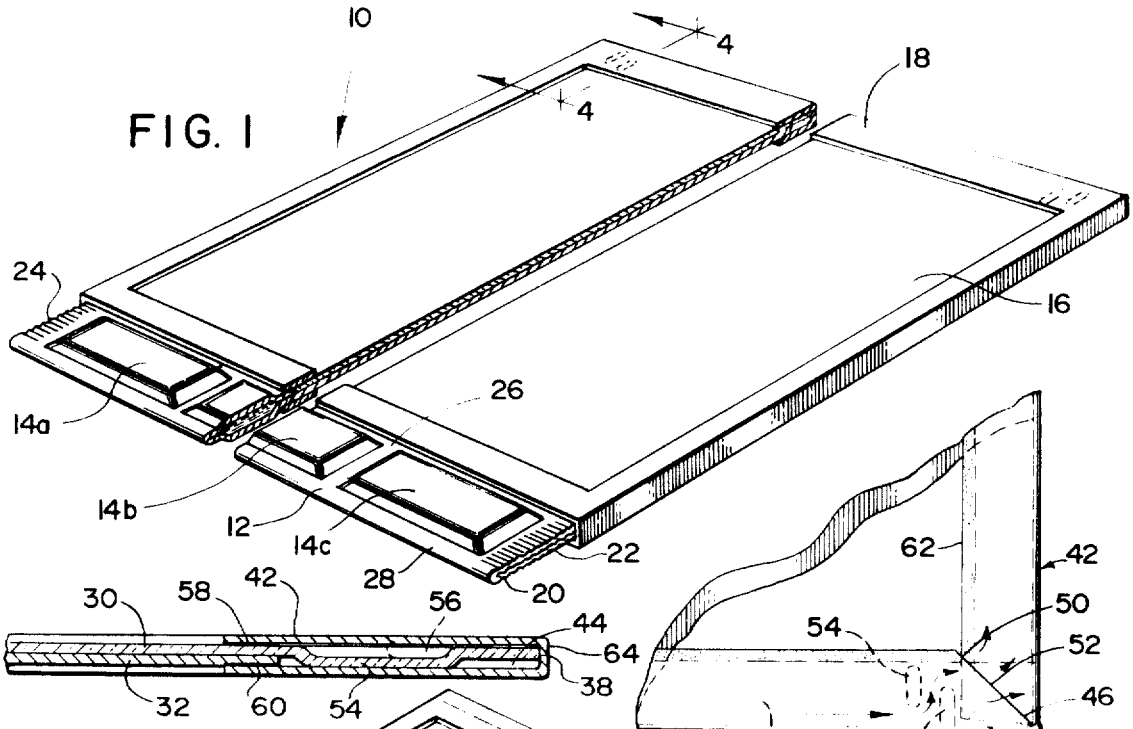
FIG. 4
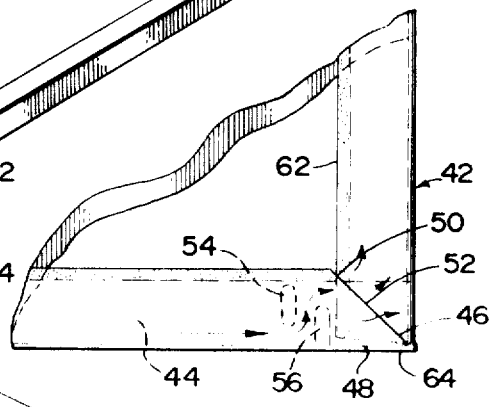
FIG. 3
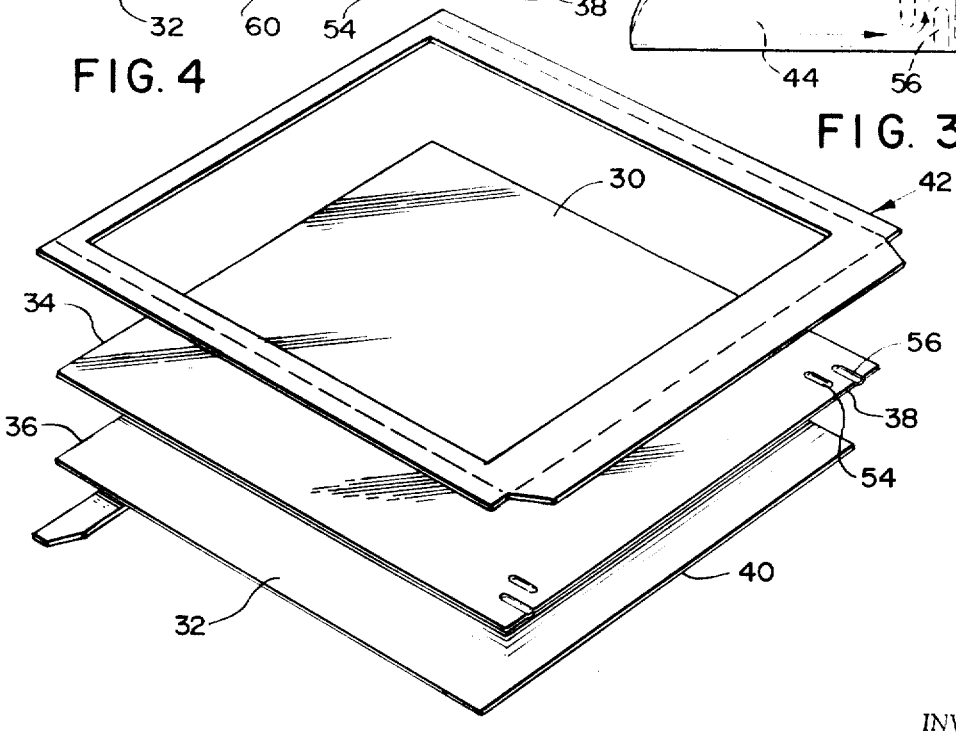
FIG. 2
INVENTOR.
RICHARD CHEN
BY Brown and Mikulka and Donald P. Selucki
ATTORNEYS United States Patent Office Re. 27,795
Reissued Oct. 30, 1973

27,795

AIR VENTING MEANS FOR PHOTOGRAPHIC FILM UNIT

Richard J. Chen, Winchester, Mass., assignor to Polaroid Corporation, Cambridge, Mass.

Original No. 3,589,904, dated June 29, 1971, Ser. No. 851,290, Aug. 19, 1969. Application for reissue Nov. 1, 1971, Ser. No. 194,721
Int. Cl. G03b *17/50*
U.S. Cl. 95—13 9 Claims

Matter enclosed in heavy brackets [ ] appears in the original patent but forms no part of this reissue specification; matter printed in italics indicates the additions made by reissue.

ABSTRACT OF THE DISCLOSURE

A self-developing photographic film unit adapted to be processed by being moved between two pressure-applying rollers. A transparent sheet is held in face-to-face contact with the photosensitive sheet with a liquid processing composition being fed between the sheets and arranged so that excess processing liquid is collected after the photosensitive sheet has been covered and any air trapped with the processing liquid is allowed to escape. The escape means provided is an unsealed portion of a fold in the binding material that holds the sheets together.

BACKGROUND OF THE INVENTION

(A) Field of the invention

This invention relates to self-developing photosensitive film units and, more particularly, to such a unit which has a compartment at the trailing edge thereof for collecting excess processing liquid with means also provided for allowing trapped air to escape.

Film units of the type with which the present invention is concerned comprise a photosensitive sheet placed in face-to-face relationship with a transparent sheet. After the photosensitive sheet is exposed through the transparent sheet, a processing liquid composition is spread between the two sheets so that the scene can be recorded by the diffusion transfer process more completely described in U.S. Pat. No. 3,415,644, assigned to the same assignee as the present invention. The spreading of the processing composition is brought about by moving the film unit progressively through pressure-applying members, such as rollers, thereby driving a quantity of processing liquid across a photosensitive sheet in front of the rollers. Typically the processing liquid is contained in one or more pods disposed near the leading edges of the photosensitive and transparent sheets. The pods are ruptured by pressure developed by the rollers during the initial movement of the unit. This causes a discharge of processing liquid into an open space between the two sheets. It should be noted that the pods are generally formed by a wrapped single sheet of material that is sealed at its sides but weakened at its seal in the direction of the sheets. Therefore, when the rollers apply the pressure in the pod, the weakened seal ruptures and the processing liquid escapes in the proper direction.

One of the basic problems associated with spreading the processing liquid across the photosensitive sheet is to insure an even spreading of the liquid over the exposed area. Due to slight variations in temperature and viscosity of the processing liquid, a slight excess of the liquid is provided in the pods over that required to completely cover the exposed photosensitive sheet. As set forth in U.S. Pat. No. 3,415,644, the processing liquid has a certain toxicity which necessitates that it not be allowed to escape from the unit. Therefore, the excess processing liquid must be contained within the unit in such a manner that it does not casually escape, while, at the same time, allowing trapped air present between the sheets to escape. It is obvious that the amount of excess liquid cannot be predicted with exact precision, and therefore a collection area must be provided which has a capacity to accept a predetermined maximum amount. At the same time, the chamber cannot be extremely oversized in that some chamber support must be provided, and this necessarily increases the cost of the unit. Stated another way, the chamber provided for the excess liquid in the present invention is established extending the transparent sheet some distance beyond the photosensitive sheet. In this manner the size of the compartment for excess liquid is determined by the amount of extension of the transparent sheet past the photosensitive sheet, which of course is shorter.

The compartment above described is maintained at a given volume by the expedient of embossings extending from the transparent sheet into the area where the photosensitive sheet would be disposed, but for its being shortened. One such type of embossings is described in U.S. Pat. *3,619,193,* [application Ser. No. 787,749] filed Dec. 30, 1968, and assigned to the same assignee as the present invention. However, the position of the embossings blocks air escape and some means must be provided when using these embossings for the escape of air to make the film unit completely foolproof. It should be made clear that the need for the embossings is because some means for maintaining the desired volume of the compartment is necessary. Otherwise the pressure of the rollers would drive the walls of the compartment together when passing over the compartment as the unit exits therefrom. Accordingly, the embossings keep the rollers spaced when passing over the compartment.

(B) Prior art

*Pat. No. 3,619,749* [Ser. No. 787,749] provides the necessary structure to prevent chamber collapse, but could conceivably prevent adequate space for trapped air to escape were air to be trapped near the center of the compartment unless air-escape means were provided in that area. Prior art film units of the type shown in *Pat. No. 3,619,193* [Ser. No. 787,749] also provide means for air-escape by puncturing sides of the fluid trap compartments. However, the provision of air vents requires a separate step in the manufacturing process which necessarily increases the cost of the units and, consequently, is undesirable. In addition, air trapped in the center of the compartment, that is, between the embossings, cannot reach the air-escape means.

OBJECTS OF THE INVENTION

Accordingly, it is an object of the present invention to provide an improved self-developing film unit which has a chamber for trapping excess processing liquid and which also provides an inexpensive means for allowing the escape of trapped air, irrespective of where in the compartment the air is trapped.

It is another object of the present invention to provide an improved self-developing film unit which has a minimum number of parts and which guarantees that a predetermined volume of the compartment is maintained during processing of the unit between spread rollers.

Other objects of the invention will in part be obvious and will in part appear hereinafter.

The invention accordingly comprises an article of manufacture possessing the features, properties, and relation of elements which will be exemplified in the article hereinafter described and the scope of the application of which will be indicated in the claims.

SUMMARY OF THE INVENTION

Briefly, I accomplish the foregoing objects by the provision of embossed areas in one portion of the film unit and by leaving selected areas of a unit binder unsealed to allow the escape of trapped air. More specifically, a photosensitive sheet is placed in face-to-face relation with a second transparent sheet which is longer than the photosensitive sheet. In certain areas of the extra length, the transparent sheet is embossed to a depth approximating the thickness of the photosensitive sheet, thereby forming a compartment. Paper binding is wrapped over the trailing end of both sheets and sealed near the end of the photosensitive sheet and across the top of the transparent sheet. This forms a compartment near the trailing edge section of both sheets. The embossing in the transparent sheet is characterized by a pair of offset depressions near both trailing edge corners. This insures that the roller cannot compress the compartment in any area, but because neither embossed area stretches the full width of the compartment, a serpentine path always exists for the escape of trapped air to the extremities of the trailing edge sections. The paper binder that forms the outer wall of a portion of the container is folded over near the corners and partially sealed. The portion that is not sealed leaves a very thin air-escape route from the compartment near either rear corner. The area left open is small enough to prevent the escape of any liquid but is large enough to allow the escape of air. Therefore, the present invention teaches a novel method of maintaining a compartment in the film unit of the type described with a predetermined volume while inexpensively allowing the passage of air that is trapped in the compartment to escape.

For a fuller understanding of the nature and objects of the invention, reference should be had to the following detailed description taken in connection with the accompanying drawings.

DESCRIPTION OF THE DRAWINGS

FIG. 1 is a perspective view of the composite film unit of the subject invention;

FIG. 2 is an exploded, perspective view of the pair of the sheets and binding means of the present invention;

FIG. 3 is a partial plan view of a portion of the film unit of FIG. 1; and

FIG. 4 is a sectional view taken along lines 4—4 of FIG. 3.

DETAILED DESCRIPTION OF THE INVENTION

Referring to FIG. 1, a film unit generally designated by numeral 10 is shown. Film unit 10 comprises a leading edge section 12 composed of pods 14a, 14b, and 14c, center portion 16, and trailing edge section 18. Leading edge section 12 is generally composed of a single sheet folded over as illustrated at 20, and a film sealed along edges 22 and 24. In area 26, which is immediately adjacent center section 16, a seal is provided but is of a weakened type. Leading edge 28 is of course formed of the folded-over material and is sealed, forming an area tightly sealed on three sides with the fourth side closed by the weakened seal. Therefore, as pressure is placed on any of the pods 14a, b, or c, which ar filled with a processing composition, hydraulic pressure will build up in the pods until a rupture thereof takes place. Designedly, this rupture takes place only in area 26.

Referring to FIG. 2, the remainder of the film unit 10 is shown. Transparent sheet 30 and photosensitive sheet 32 generally comprise center section 16. These sheets are placed in face-to-face disposition with their leading edges 34 and 36, respectively, being substantially coextensive. Trailing edges 38 and 40, respectively, however, are not coextensive for reasons hereinafter explained. Binding means 42 is substantially a sheet of paper cut to the appropriate dimensions and folded along the dotted lines shown in FIG. 2 so as to wrap around sheets 30 and 32 to form the remainder of film unit 10. As herein described, therefore, trailing edge section 18 comprises the portion of transparent sheet 30 that extends beyond photosensitive sheet 32 and the portion of the binding means 42 that wraps around the extended trailing edge 38 and is fastened near the end of trailing edge 40 of sheet 32. Therefore, when appropriately assembled, as best seen in FIGS. 3 and 4, a compartment 44, the thickness of sheet 32, is formed.

Referring to FIG. 3, the underside of one of the corners of the film unit shown in FIG. 1 is illustrated. Binding means 42 is wrapped around the sheets placed in face-to-face relationship so as to form the fold 46. Fold 46 is sealed in area 48 and in area 50 so as to allow a path for air to escape from compartment 44 through the unsealed area 52 of fold 46. The corner illustrated in FIG. 3 is duplicated in mirror image on the corresponding opposite corner of trailing edge section 18.

Embossings 54 and 56 are, in fact, depressed portions of transparent sheet 30 extending downward therefrom a distance substantially the same distance as the thickness of sheet 32. Embossing 54 extends from trailing edge 40 of sheet 32 parallel to the longitudinal axis of compartment 44 to the rear and on a plane normal thereto, as best seen in FIG. 3. Similarly, embossing 56 is parallel but offset with respect to embossing 54 and extends forwardly from trailing edge 38 of sheet 30. The arrows in FIG. 3 illustrate the serpentine path for air flow between the offset embossed areas with the exit for the air being in area 52. Accordingly, the collective volume of the space between sheets 30 and 32 plus compartment 44 exceeds the volume of the total processing liquid.

Referring to FIG. 4, binding means 42 is shown as being sealed to sheet 30 at 58 and is sealed to sheet 32 at 60. Accordingly, compartment 44 is maintained with practically its complete volume intact even when film unit 10 is drawn between pressure rollers and the lower roller traverses the area beyond photosensitive sheet 32. A minimum-thickness package is thereby provided with adequate support in the area where the excess processing liquid is collected, at the same time allowing an inexpensive air exit to be provided. Area 52, which is the area for air exit, always has a portion thereof in an open condition as a roller moves relative to the trailing edge section. This effect is made possible by the tapers of the fold from the inner margin 62 of the binding means 42 toward the trailing edge of the film unit defined by line 64. Therefore, no separate machining operation to form an air vent is required as the binding means must be provided to hold the film unit intact. This unique air vent means is always left in an open condition for the venting of air regardless of the position of the compression rollers at a given moment due to the fact that the opening is defined by a flap disposed at some angle relative to the longitudinal axis of the film unit. This is made clear by the relative angular position of areas 50, 52, and 64.

In operation, photosensitive sheet 32 is exposed through transparent sheet 30. This is done by a typical shutter mechanism in a camera of the type described in Ser. No. 655,850, now abandoned, assigned to the same assignee as the present invention. When this occurs, as set forth in the aforementioned application, the film unit 10 is driven between compression rollers starting with leading edge 28. As the rollers progress into pods 14, 14b, and 14c, a pressure build-up occurs therein and a controlled rupture takes place in area 26. This results in a parting of the folded-over sheet 22 resulting in the injection of a processing composition between sheets 30 and 32. It is clear that sheets 30 and 32 are peripherally sealed by binding means 42 except on the side adjacent area 26. This results in the processing composition being spread between sheets 30 and 32 as the rollers progress toward the trailing edge section. As previously described, an excess of developing or processing material is needed from that capable of completely covering the exposed area of sheet 30. The substance of the present invention is involved in handling this excess of processing material and air trapped with it.

Referring to FIG. 4, it will be assumed that the rollers are disposed on either side of the trailing edge section 18 over sealed areas 58 and 60. Presumably, some air has been driven in front of the rollers, between the sheets and is now disposed in compartment 44. As the excess of processing liquid enters compartment 44, it is possible under some circumstances that the amount of air trapped there be of sufficient quantity to leave insufficient volume for excess processing liquid. Therefore, this air would be compressed and possibly cause a refeeding of the excess material between sheets 30 and 32 but for some air-escape provision.

It should also be noted that it is impossible to predict in which area of trailing edge section 18 air will be trapped, and it must be assumed, for purposes of reliability, that air is trapped in all areas of compartment 44 across the width thereof. By the same token, embossings 54 and 56 prevent compartment 44 from collapsing under the pressure of the opposed rollers as this compartment is filled initially with air and then with the processing liquid.

Referring to FIG. 3, when rollers progress along film unit 10 so that they are on either side of the trailing edge section 18, the trapped air will follow a route denoted by the arrows and will exit in area 52. This of course occurs on either side of trailing edge section 18 as previously explained. Therefore, the air is not compressed and there is no resistance to the flow of excess processing liquid into compartment 44. Compartment 44 is designed to be of sufficient size to accommodate the amount of excess liquid available under even the most adverse circumstances, this being due to any variance of viscosity due to temperature and/or pressure extremes. Therefore, the objects of the invention have been realized in that film unit 10 can function automatically in the environment shown in Ser. No. 655,850, now abandoned, while still maintaining a repository for the excess processing material, leaving no chance of its spurious escape from the film unit. After a short period of time, the excess liquid contained in compartment 44 will dry and will no longer present any type of problem to an operator because of its toxicity. This is especially true due to the opening provided in the area 52 which allows air flow into compartment 44 to accelerate the drying.

Since certain changes may be made in the above article without departing from the scope of the invention herein involved, it is intended that all matter contained in the above description or shown in the accompanying drawings shall be interpreted as illustrative and not in a limiting sense.

What is claimed is:

[1. A photographic film unit of the type that is adapted to be processed by being moved, leading edge foremost, relative to and between at least two pressure-applying members to distribute a liquid processing composition within said film unit toward a trailing edge thereof, said film unit comprising:

a photosensitive sheet having a trailing edge section;

a second sheet having a trailing edge section; and binding means for holding said sheets in face-to-face relation with said trailing edge section of one of said sheets extending beyond the trailing edge section of another of said sheets, thereby forming a compartment adjacent the trailing edge section of the extending sheet for collecting excess liquid processing composition driven past the portions of the sheets in face-to-face relation;

said second sheet being embossed to form a plurality of offset depressions extending from said second sheet in a plane normal thereto a distance substantially the same as the thickness of said photosensitive sheet to maintain the integrity of said compartment as the sheets are drawn between the pressure-applying members, said compartment having at least one outlet therefrom formed by spaces between portions of said binding means.]

[2. A photographic film unit according to claim 1 wherein said spaces are formed by overlapped portions of said binding means that are unsealed.]

[3. A photographic film unit according to claim 1 wherein said second sheet has a pair of offset embossed portions on each side of said trailing end sections, thereby providing a path for trapped air in said compartment to escape toward said outlets from the center portion of said compartment.]

[4. A photographic film unit according to claim 1 wherein said binding means is folded over at each corner of said trailing edge sections and partially sealed so that space is provided for the escape of air at a pressure above atmospheric but providing insufficient space for escape of the liquid processing composition.]

[5. A photographic film unit according to claim 1 wherein said compartment and the space between said transparent and photosensitive sheets has a collective volume in excess of the volume of processing liquid.]

[6. A photographic film unit according to claim 2 wherein said overlapped portions form openings defined by flaps disposed at some angle with respect to the longitudinal axis of the film unit.]

[7. A photographic film unit according to claim 3 wherein said pair of embossed portions includes at least two depressions extending from said transparent sheet parallel to the longitudinal axis of said compartment, one of said depressions extending rearwardly from a trailing edge of said photosensitive sheet a distance less than the longitudinal length of said compartment, a second of said depressions extending forwardly from a trailing edge of said transparent sheet a distance less than the longitudinal length of said compartment.]

[8. A photographic film unit according to claim 7 wherein the outermost depression extends from the trailing edge of said transparent sheet.]

[9. A photographic film unit according to claim 7 wherein the innermost depression extends from the trailing edge of said transparent sheet.]

[10. A photographic film unit according to claim 7 wherein a path for air escape from said compartment to the exterior of said film unit is provided at all times, regardless of the momentary position of the pressure-applying members relative to said film unit due to the offset position of said depressions and the angular disposition of said flaps.]

*11. In a photographic film unit of the type adapted to be processed by a liquid processing composition distributed within said film unit toward the trailing edge thereof by and in response to movement of said film unit, leading end foremost, relative to and between a pair of pressure-applying members, said film unit including a photosensitive sheet having a trailing end section and a second sheet having a trailing end section, the improvement comprising:*

*a binding sheet secured around and to margins of said photosensitive and second sheets for holding the latter in face-to-face relation with said trailing end section of one of said sheets extending beyond the trailing edge of the other of said sheets in facing relation to a trailing end portion of said binding sheet and cooperating therewith to form a chamber for collecting and retaining excess liquid processing composition distributed beyond said trailing edge of said other sheet;*

*said extended trailing end section of said one sheet including a plurality of portions embossed normally to the plane of said one sheet toward the other of said sheets and said portion of said binding sheet to form a plurality of depressions and corresponding raised portions having, respectively, depths and heights at least equal to the thickness of said other sheet to maintain the spacing betweeen said extended*

*trailing end section and said portion of said binding sheet and the integrity of said chamber as said extended end section and said portion of said binding sheet are moved between a pair of pressure-applying members, said chamber having at least one outlet therefrom formed by spaces between portions of said binding sheet to permit the escape of air from said chamber.*

*12. A photographic film unit according to claim 11 wherein said second sheet is said one sheet.*

*13. A photographic film unit according to claim 11 wherein said embossed portions include two pairs of closely spaced depressions, each of said pairs being located adjacent a lateral edge of said extended trailing end section, said depressions of each pair extending in side-by-side relation longitudinally of said film unit and overlapping one another to provide a tortuous path for the escape of air laterally toward outlets in the lateral extremities of said chamber.*

*14. A photographic film unit according to claim 11 wherein said extended end section is formed with two pairs of embossed portions each located near a lateral edge of said extended end section and including a first depression extending from the trailing edge of said one sheet toward said trailing edge of said other sheet a distance approximately half the distance between said trailing edges and the longitudinal dimension of said chamber and a second depression extending from adjacent said trailing edge of said other sheet toward said trailing edge of said one sheet a distance of approximately half the distance between said trailing edges and said longitudinal dimension of said chamber.*

*15. A photographic film unit according to claim 14 wherein said depressions are of approximately the same width and the depressions of each pair are spaced from one another by approximately said width of said depressions.*

*16. A photographic film unit according to claim 14 wherein the depression of each of said pairs closest the lateral edge of said one sheet extends from said trailing edge thereof toward the said trailing end thereof.*

*17. A photographic film unit according to claim 14 wherein the depression of each of said pairs closest the lateral edge of said one sheet extends from adjacent said trailing edge of said other sheet toward said trailing edge of said one sheet.*

*18. A photographic film unit according to claim 11 wherein said portions of said binding sheet are sealed to one another in overlapped relation adjacent the corners of said extended end section of said one sheet except for sections of said overlapped portions left unsealed to one another to form said spaces.*

*19. A photographic film unit according to claim 18 wherein said binding sheet is folded over at each corner of said extended trailing end section and partially sealed to provide space for the escape of air at a pressure above ambient and providing insufficient space for the escape of liquid processing composition.*

References Cited

The following references, cited by the Examiner, are of record in the patented file of this patent or the original patent.

UNITED STATES PATENTS

| | | | |
|---|---|---|---|
| 3,615,540 | 10/1971 | Land et al. | 96—76 C |
| 3,619,193 | 11/1971 | Knight | 96—76 R |
| 3,615,436 | 10/1971 | Campbell | 96—76 X |
| 3,652,281 | 3/1972 | Bachelder et al. | 96—76 C |
| 3,607,285 | 9/1971 | Chen | 96—76 C |
| 2,627,460 | 2/1953 | Land | 96—76 X |

RICHARD L. MOSES, Primary Examiner

U.S. Cl. X.R.

96—76 C